Patented Dec. 3, 1935

2,023,337

UNITED STATES PATENT OFFICE 2,023,337

RESIN ACID DERIVATIVES AND PROCESS OF PREPARING THE SAME

Otto Nicodemus, Frankfort-on-the-Main-Hochst, and Otto Wulff, Hofheim-in-the-Taunus, Germany, assignors to I. G. Farbenindustrie Aktiengesellschaft, Frankfort-on-the-Main, Germany No Drawing. Application January 13, 1933, Serial No. 651,656. In Germany February 2, 1932

13 Claims. (Cl. 260—99.30)

This invention relates to new resin acid derivatives and to the process of preparing the same.

We have found that nitriles of resin acids can be obtained by causing gaseous ammonia to act upon a resin acid or an ester thereof, if desired, in the presence of a solvent or a diluent at a raised temperature and in the presence of a known dehydrating catalyst. All catalysts known to promote a reaction in which water is eliminated such as aluminium oxide, thorium oxide, silica-gel or the like may be used.

As resin acids, there may be used colophony and all the other mixtures of natural resin acids or the esters thereof; it is likewise possible to start from pure resin acids, for instance from abietic acid. In order to facilitate the reaction, the initial materials may be used in admixture with a diluent. As diluents there may be used, for instance, hydrocarbons, alcohols, organic acids or nitriles. As nitriles there may be used the nitriles of resin acids themselves, particularly the more fluid fractions which are obtained by the fractional distillation of the nitriles of the resin acid.

The new nitriles of the resin acids are more or less viscous balsams which may be distilled under reduced pressure and some of which are capable of crystallizing. They show the typical reaction of nitriles; for instance, they may be converted into the corresponding primary and secondary amines by hydrogenation. They represent valuable auxiliary products in the textile industry and serve as parent materials for new valuable products.

It is known that nitriles may be made from acids or the esters thereof by an analogous process but it is very surprising that the hitherto unknown nitriles of resin acids can be produced in this manner. It was rather to be feared that the resin acids which, as is known, are very sensitive to high temperatures, would be split up and decomposed during the reaction.

The following examples serve to illustrate our invention, but they are not intended to limit it thereto.

(1) Ammonia gas is conducted through a tube which is heated to 350° C.–360° C. and is filled with silica-gel; there is simultaneously introduced drop by drop a mixture of equal weights of American colophony and benzene. The escaping vapors are condensed, the excess of ammonia gas being reconducted into the process. The condensate after removal of the water which has separated, is a benzene solution of nitriles of resin acids from which the nitriles themselves may be obtained in form of a thick, feebly brownish oil by distilling the benzene.

These nitriles of resin acids can further be separated by a fractional distillation under reduced pressure. There is thus obtained a small portion of a relatively fluid oil which boils at about 190° C.–230° C. at a pressure of 20 mm., whereas the chief quantity distils at about 235° C.–250° C. at a pressure of 20 mm. and is a highly viscous, tough mass at room temperature and has only a feebly brownish color.

The analysis of the distillates shows the following percentages:

| | Fraction boiling at 190° C.–230° C. at 20 mm. | Fraction 235° C.–250° C. at 20 mm. | Calculated for the nitrile of resin acid $C_{20}H_{29}N$ (nitrile of abietic acid) |
|---|---|---|---|
| | Percent | Percent | Percent |
| C | 86.40 | 85.10 | 84.74 |
| H | 10.95 | 10.22 | 10.32 |
| N | 2.73 | 4.57 | 4.95 |

As it is evident from the above table the higher boiling fraction principally consists of nitrile of resin acid, whereas the lower-boiling fraction still contains hydrocarbons. The resin acid can be regenerated from the nitrile by saponification and the nitrile can be transformed into the corresponding amine by hydrogenation by means of sodium and an alcohol or by a catalytic process; such amines are colorless, highly viscous oils showing the known reactions of amine. Instead of using benzene as diluent for colophony, there may be applied other hydrocarbons. Nitriles, for example nitrile of stearic acid which, when mixed with an equal weight of colophony yields a rather thin, liquid solution even at room temperature, are very well adapted as diluents. Unsaturated nitriles, for example those having a boiling point of 100° C.–170° C. are likewise well suited as diluents. For the same purpose, there may also be used the nitrile of resin acid itself, particularly the portion of low-boiling point or first runnings, whereby the advantage is attained of operating without any foreign substance.

As diluents there may also be used organic acids, for instance acetic acid, or commercial oleic acid. These acids are converted into the nitriles in the course of the process.

The nitriles of the resin acids are separated from the other acid nitriles which have been added or which are formed by a fractional distillation, if required, under reduced pressure.

(2) A solution of colophony in an equal weight of alcohol is conducted over the catalyst as described in Example (1).

The nitrile of the resin acid separates in the condensate in form of a lower layer which is viscous and scarcely colored and can directly be drawn off and purified by a fractional distillation under reduced pressure as described in Example (1). The upper layer contains aqueous alcohol.

(3) In the same manner as described in Example (2) the nitrile of the resin acid can also be obtained by conducting in a current of ammonia gas a solution of American colophony in an equal weight of alcohol over a catalyst consisting of glassy aluminium oxide at 340° C.–360° C.

(4) Into an iron pipe filled with silica-gel and heated to 340° C.–360° C. American colophony which has been melted in a suitable vessel by means of superheated steam to form an easily flowing mass is introduced drop by drop while simultaneously conducting ammonia gas through the tube. The crude nitrile of resin acid separates in the condensate above the water formed in form of a viscous oil and can be purified by a fractional distillation under reduced pressure as described in Example (1).

(5) Instead of American colophony there is used root resin, carrying out the process in the same manner described in Example (1).

After having been fractionated under reduced pressure, the oily condensate yields a chief fraction boiling at 240° C.–250° C. under a pressure of 20 mm.; the analysis shows the following percentages: C: 85.09%; H: 10.22%; N: 4.64%, whereas the following figures are calculated for the nitrile of abietic acid: C: 84.74%; H: 10.32%; N: 4.95%.

(6) In the same manner as described in Example (1), the liquid resin which is obtained as a waste product from the manufacture of cellulose from pine wood and is a brown, viscous liquid mixture of esters of fatty acids and resin acids is conducted at 340° C.–360° C. in a current of ammonia over a catalyst consisting of silica-gel, without using a solvent. The thick-oily condensate is separated into several fractions by means of a fractional distillation under reduced pressure, the fraction boiling at 210° C.–225° C. under a pressure of 20 mm. containing the nitriles of fatty acids and a small quantity of hydrocarbons besides the nitriles of resin acid, whereas the fraction which boils at 240° C.–260° C. under a pressure of 20 mm. is according to its analysis (C: 84.95%; H: 10.62% and N: 5.03%) a nitrile of resin acid $C_{20}H_{29}N$ (calculated: C: 84.74%; H: 10.32%; N: 4.95%).

We claim:

1. The process which comprises acting with gaseous ammonia upon a resin compound of the group consisting of resin acids and their esters at an elevated temperature and in the presence of a catalyst known to promote dehydration reactions.

2. The process which comprises acting with gaseous ammonia upon a resin compound of the group consisting of resin acids and their esters at a temperature between about 300° C. and about 400° C. and in the presence of a catalyst known to promote dehydration reactions.

3. The process which comprises acting with gaseous ammonia upon a resin compound of the group consisting of resin acids and their esters at an elevated temperature in the presence of a solvent for the resin compound and of a catalyst known to promote dehydration reactions.

4. The process which comprises acting with gaseous ammonia upon a resin compound of the group consisting of resin acids and their esters at a temperature between about 300° C. and about 400° C. in the presence of a solvent for the resin compound and of a catalyst known to promote dehydration reactions.

5. The process which comprises acting with gaseous ammonia upon a resin compound of the group consisting of resin acids and their esters at an elevated temperature in the presence of another organic acid serving as a solvent for the resin compound and in the presence of a catalyst known to promote dehydration reactions.

6. The process which comprises acting with gaseous ammonia upon a resin compound of the group consisting of resin acids and their esters at a temperature between about 300° C. and about 400° C. and in the presence of silica-gel.

7. The process which comprises acting with gaseous ammonia upon a resin compound of the group consisting of resin acids and their esters at a temperature between about 300° C. and about 400° C. and in the presence of aluminium oxide.

8. The process which comprises acting with gaseous ammonia upon colophony at a temperature between about 300° C. and about 400° C. in the presence of a catalyst known to promote dehydration reactions.

9. The process which comprises acting with gaseous ammonia upon colophony at a temperature between about 300° C. and about 400° C. in the presence of silica-gel.

10. Nitriles of resin acids, which nitriles form highly viscous balsams.

11. The nitriles of the resin acids of colophony, which form a highly viscous balsam.

12. The nitriles of the resin acids present in root resin which nitriles form highly viscous balsams.

13. The nitriles of the resin acids present in the liquid resin which is obtained as a waste product from the manufacture of cellulose from pine wood.

OTTO NICODEMUS.
OTTO WULFF.